(12) United States Patent
Ogura et al.

(10) Patent No.: US 8,646,290 B2
(45) Date of Patent: Feb. 11, 2014

(54) METHOD OF MANUFACTURING A GLASS OPTICAL ELEMENT

(75) Inventors: Kazuyuki Ogura, Osaka (JP); Yoshihiro Kamada, Osaka (JP); Kojiro Takatori, Tokyo (JP); Kazunari Tada, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 412 days.

(21) Appl. No.: 12/618,472

(22) Filed: Nov. 13, 2009

(65) Prior Publication Data

US 2010/0058809 A1 Mar. 11, 2010

Related U.S. Application Data

(62) Division of application No. 11/404,052, filed on Apr. 13, 2006, now abandoned.

(30) Foreign Application Priority Data

Apr. 14, 2005 (JP) ................................. 2005-116805

(51) Int. Cl.
*C03B 11/08* (2006.01)
(52) U.S. Cl.
USPC .................................... 65/66; 65/102; 65/305
(58) Field of Classification Search
USPC .......... 65/305, 307, 311–312; 264/1.31–1.35; 425/808
See application file for complete search history.

(56) References Cited

U.S. PATENT DOCUMENTS

| 4,623,496 A | 11/1986 | Verhoeven et al. |
| 4,731,623 A | 3/1988 | Oda et al. |
| 5,032,160 A * | 7/1991 | Murata et al. ................... 65/102 |
| 5,162,938 A | 11/1992 | Iima et al. |
| 5,549,855 A * | 8/1996 | Nakanishi et al. ............. 264/2.5 |
| 5,603,871 A | 2/1997 | Koseko et al. |
| 5,616,161 A * | 4/1997 | Morikita ......................... 65/157 |
| 5,630,859 A * | 5/1997 | Takagi et al. ................... 65/102 |
| 5,808,999 A | 9/1998 | Yagi |
| 5,904,747 A * | 5/1999 | Kataoka et al. ................. 65/102 |
| 6,091,532 A * | 7/2000 | Nakanishi et al. ......... 359/205.1 |
| 6,829,109 B2 * | 12/2004 | Kikuchi ....................... 359/819 |
| 2002/0039223 A1 | 4/2002 | Yoshida |
| 2003/0048535 A1 | 3/2003 | Maruyama et al. |
| 2003/0115907 A1* | 6/2003 | Patton et al. .................... 65/106 |
| 2003/0159467 A1 | 8/2003 | Hirota et al. |
| 2004/0086300 A1 | 5/2004 | Kawai et al. |
| 2004/0196567 A1 | 10/2004 | Hosoe |

FOREIGN PATENT DOCUMENTS

JP 2002-208159 7/2002

* cited by examiner

*Primary Examiner* — Jodi C Franklin
(74) *Attorney, Agent, or Firm* — Brinks Gilson & Lione

(57) ABSTRACT

A manufacturing apparatus of the present invention has a pair of dies that form each cylindrical surface, and a plane member that forms side surfaces of an element. The upper die and the lower die has a cylindrical surface which is worked so as to have generatrix which connects intersection points between a non-arc axis and a cylindrical section and between an arc center axis and the cylindrical section. The plane member is pressed against reference surfaces of the upper die and the lower die. In this state, a glass material is put between the upper die and the lower die, and a distance between the upper die and the lower die is decreased. As a result, the cylindrical surfaces of the upper die and the lower die and the plane of the plane member are transferred onto the glass material.

6 Claims, 4 Drawing Sheets

METHOD OF MANUFACTURING A GLASS OPTICAL ELEMENT

CROSS-REFERENCE TO RELATED APPLICATIONS

This is a divisional application of and claims the benefit of priority from application Ser. No. 11/404,052 filed Apr. 13, 2006, entitled Glass Optical Element And Manufacturing Method Thereof, and currently pending.

The present application claims priority to Japanese Patent Application No. 2005-116805 filed in Apr. 14, 2005, the entire content of which is hereby incorporated by reference.

BACKGROUND OF THE INVENTION

1. Field of the Invention

The present invention relates to a glass optical element. Particularly, the invention relates to a beam shaping element that converts oval output light from a blue laser diode or the like into circular light.

2. Description of the Related Art

In general, a light source which is used in a pickup optical system is a laser diode (LD), its output light is an oval divergent beam. When the divergent beam is focused by an objective lens directly, the beam is emitted only to a part of a circular recording region or also to the outside of the recording region, thereby deteriorating accuracy of recording and reproduction. A sectional shape of the beam should be, therefore, shaped so that the section has a circular shape on a recording medium.

Particularly in recent years, although blue semiconductor lasers are used as light sources, the accuracy required for recording and reproducing signals becomes strict due to shortening of a wavelength. Output of the blue lasers is, however, weak at present, a sufficient laser power for accurate recording and reproducing cannot be secured. In order to solve this problem, utilization efficiency of a laser should be heightened by shaping the oval section of a beam from LD into a circular beam section. For this reason, a beam shaping technique becomes very important.

Beams are normally shaped by beam shaping elements. As a result, divergent beams are directly shaped, and beams having approximately circular section can be generated with rarely generating aberration. As such elements, beam shaping elements whose both surfaces are cylindrical are proposed. For example, Japanese Patent Application Laid-Open No. 2002-208159 discloses such a beam shaping element.

In such beam shaping elements, high eccentric accuracy between generatrices on respective cylindrical surfaces is required (parallel eccentricity: about 1 to 10 μm tilt eccentricity: about 1 to 10 min.)

Further, in such beam shaping elements, alignment work with high accuracy is necessary at the time of incorporating a pickup, and thus the adjusting method becomes very difficult (parallel eccentricity: about 1 to 10 μm, tilt eccentricity: 1 to 5 min.)

SUMMARY OF THE INVENTION

It is a main object of the present invention to provide an apparatus that manufactures a glass optical element having high eccentric accuracy.

It is another object of the present invention to provide a beam shaping element with high eccentric accuracy.

In order to achieve these objects and other objects, from a certain aspect of the present invention, an apparatus that manufactures a glass optical element includes:

an upper die having a cylindrical surface worked so as to have an upper die generatrix for connecting intersection points between a non-arc axis and a cylindrical section and between an arc center axis and the cylindrical section, and an upper die reference surface worked so as that a distance from the upper die generatrix obtains a default;

a lower die having a cylindrical surface worked so as to have a lower die generatrix for connecting intersection points between a non-arc axis and a cylindrical section and between an arc center axis and the cylindrical section, and a lower die reference surface worked so that a distance from the lower die generatrix obtains a default; and a side surface forming member which is pressed against the reference surfaces of the upper die and the lower die and forms side surfaces of the glass element to be molded between the upper die and the lower die.

From another aspect of the present invention, a method of manufacturing a glass optical element using an upper die having a cylindrical surface worked so as to have an upper die generatrix for connecting intersection points between a non-arc axis and a cylindrical section and between an arc center axis and the cylindrical section, and a lower die having a cylindrical surface worked so as to have a lower die generatrix for connecting intersection points between a non-arc axis and a cylindrical section and between an arc center axis and the cylindrical section, the method includes the steps of:

pressing a side surface forming member against an upper die reference surface worked so that a distance from the upper die generatrix obtains a default and a lower die reference surface worked so that a distance from the lower die generatrix obtains a default; and moving any one of the upper and lower dies to a direction where a distance between the upper die and the lower die becomes short in a state that the upper die reference surface and the lower die reference surface are maintained in one plane, molding the glass material arranged between the upper die and the lower die, and transferring a surface plane of the side surface forming member is transferred onto the optical element.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawing.

DETAILED DESCRIPTION OF THE PREFERRED EMBODIMENT

Figure 1A:
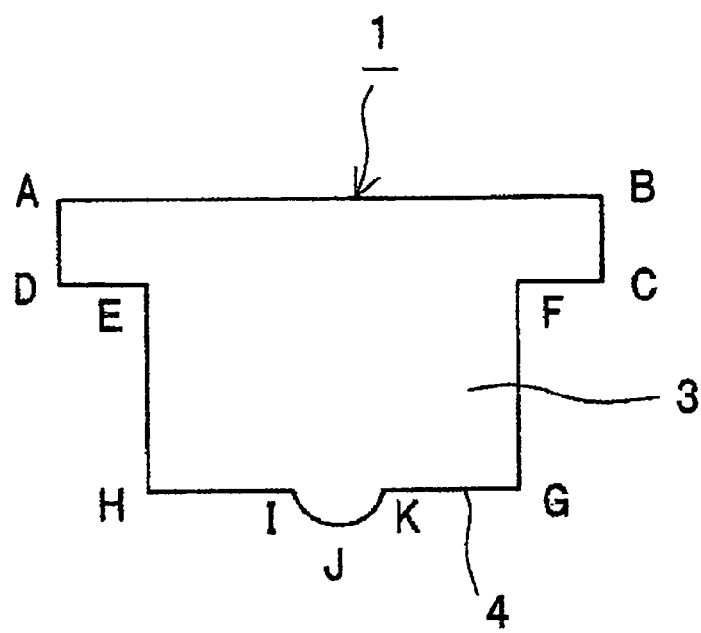
FIGS. 1A and 1B are typically sectional views of upper and lower dies.
Figure 1B:
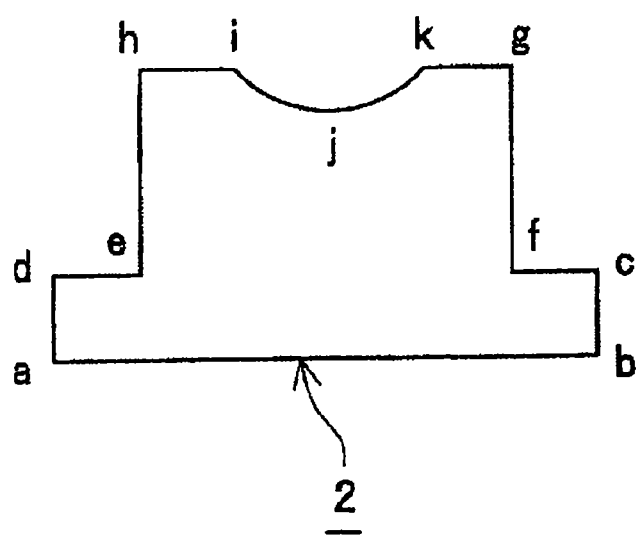

FIGS. 1A and 1B illustrate one example of a pattern sectional view of a set of upper and lower dies to be used when a beam shaping element whose both surfaces are cylindrical surfaces is manufactured.

In this embodiment, a direction vertical to a sheet surface on which the section of the dies in FIG. 1 is drawn is defined as "generatrix direction", and a direction vertical to the generatrix, for example, a direction parallel with a side AB is defined as "directrix direction". In the present invention, "parallel" and "vertical" are used as concepts meaning "approximately parallel" and "approximately vertical", respectively, and in this specification "approximately" means 60 minutes (1° or less.

(Upper Die)

The upper die 1 is constituted by forming a molding surface HIJKG 4 on a die base material 3. A die section of the upper die 1 is composed of a rectangle ABCD, a rectangle EFGH having a side EF not more than the length of a side CD, and a cylindrical section IJK formed on a side HG. The cylindrical section IJK has a convex shape. In the present invention, the cylindrical section includes an arc surface and a non-arc surface. The upper die 1 has a thickness such that the die sections are laminated in a generatrix direction. A surface formed by connecting the cylindrical sections IJK in the generatrix direction is a cylindrical surface (front surface) of the upper die. Further, the cylindrical section IJK is preferably positioned at the center of a transfer surface HIJKG, but the constitution is not limited to this form as long as the cylindrical surface is formed so that the following "default" is satisfied.

In this embodiment, a die side surface (plane) in the generatrix direction including a side EH and or a side FG, particularly, the die side surface including the side EH is defined as "upper die reference surface 1". The following mainly explains the reference surface 1, but the die side surface including the side FG may be applied as an "upper die reference surface 2" to the following description, or both the "upper die reference surface 1" and the "upper die reference surface 2" may be applied to the following description.

The upper die 1 used in this embodiment has the cylindrical surface which is worked so as to have a line ("upper die generatrix") for connecting an intersecting point between a non-arc axis and the cylindrical section IJK and an intersection point between an arc center axis and the cylindrical section IJK. The "non-arc axis" is defined by a center line of a non-arc shape and an asymmetrical shape defined by an aspherical formula and an aspherical coefficient, and the "arc center axis" is defined by a vertical bisector of both ends (for example, I and K in FIG. 1) in an arc working area of the die.

Further, the upper die used in this embodiment is worked so that a distance between the generatrix of the upper die and the upper die reference surface 1 obtains a default.

In the present invention, the "default" is a value such that a difference between the distance of the upper die generatrix and the upper die reference surface 1 and a distance of a lower die generatrix and the lower die reference surface 1 becomes about not more than the half of a parallel eccentricity tolerance (1 to 10 μm) required by each target cylindrical surface of a beam shaping element in a state that the upper die reference surface 1 and a lower die reference surface 1 are flush with each other.

(Lower Die)

A lower die 2 is constituted so that a molding surface hijkg is formed on a die base material, and its section is composed of a rectangle abcd, a rectangle efgh having a side of whose length is not more than a side cd, and a cylindrical section ijk formed on a side hg. The cylindrical section ijk has a concave shape in FIG. 1.

The lower die 2 has a thickness such that the die sections are laminated in the generatrix direction. Further, a surface which is formed by connecting the cylindrical section ijk in the generatrix direction is the cylindrical surface (front surface) of the lower die.

In this embodiment, a die side surface (plane) in the generatrix direction including a side eh or a side fg, particularly the side surface including the side eh is defined as the "lower die reference surface 1". The following mainly explains the reference surface 1, but needless to say, the die side surface including the side fg may be applied as a "lower die reference surface 2" to the following description, or both the "lower die reference surface 1" and the "lower die reference surface 2" may be applied to the following description.

The lower die 2 used in this embodiment has the cylindrical surface which is worked so as to have a line ("lower die generatrix") which connects an intersection point between a non-arc axis and the cylindrical section ijk and an intersection point between an arc center axis and the cylindrical section ijk.

The lower die used in this embodiment is worked so that a distance between the lower die generatrix and the lower die reference surface 1 obtains a default.

In this embodiment, a general material such as sintered hard alloy, cermet or SiC which is normally used for a glass lens molding die can be used for the base material of both the upper and lower dies, but particularly sintered hard alloy is preferable. The cylindrical surface is such that a molding surface is subject to desired mirror-like finishing such as grinding process which is conventionally known.

At least the die reference surface is worked by general wire working or the like so that its maximum height Ry becomes not more than 0.8 μm.

The upper die of FIG. 1 has the plane in the generatrix direction which includes the side HI and the side KG, but such a plane is not always necessary, and the side HI and the side KG are not always parallel with the directrix direction. That is to say, it may have positive or negative inclination, or may be asymmetrical. The lower die of FIG. 1 has the plane in the generatrix direction which includes the side hi and the side kg, but such a plane is not always necessary, and the side hi and the side kg are not always parallel with the chile line direction. It may have positive or negative inclination, or may be asymmetrical.

Figure 2:
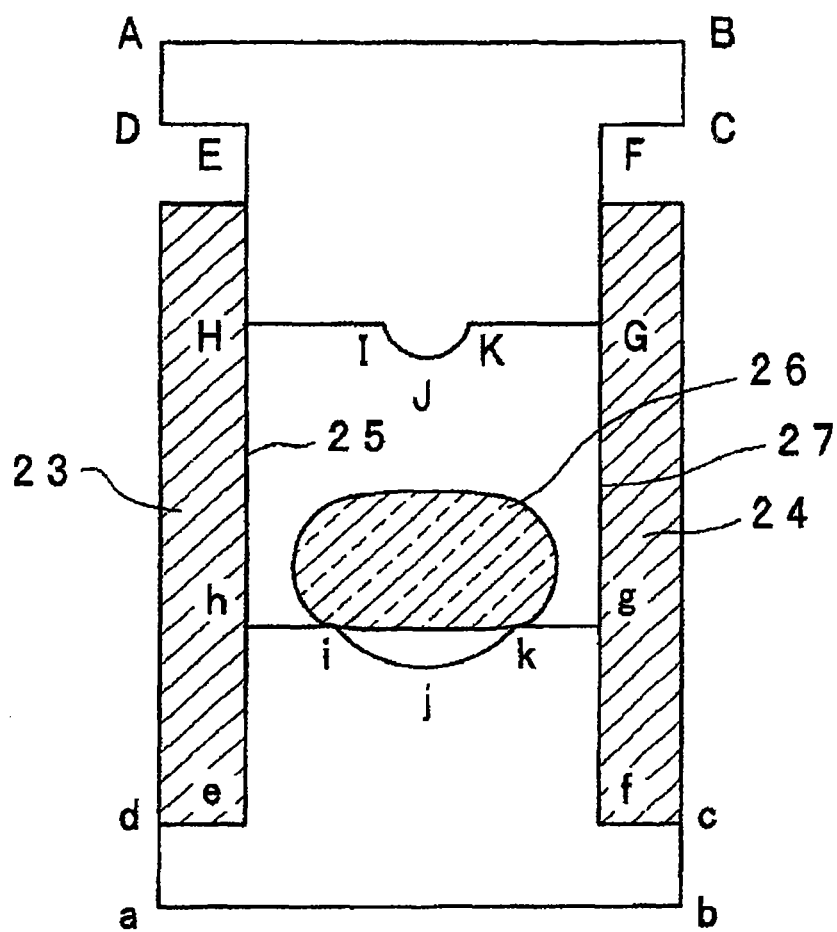
FIG. 2 is diagram explaining a method of molding a glass material.

In order to manufacture the beam shaping element whose both surfaces are cylindrical surface using the upper and lower dies, as shown in FIG. 2, a glass element 26 is arranged between the upper and lower dies, a side surface forming member ("side surface forming member 23") is pressed against the reference surfaces of the upper and lower dies. Further, the side surfaces of the upper and lower dies opposed to the reference surfaces in the directrix direction are pressed by a side surface forming member ("side surface forming member 24"), and any one of the upper and lower dies is moved to a direction where the distance between the upper and lower dies becomes short, so that the glass element 26 is molded.

The side surface forming member 23 is a plane member, and enables the molding of the glass element in a state that the reference surfaces 1 of the upper and lower dies are placed on one plane. The side surface forming member 23 is a member for transferring a surface plane 25 of the plane member to the glass material 6. The material, size, strength and the like of the plane member are not particularly limited as long as fusing or the like of the member and the glass material does not occur, distortion does not occur on the surface plane 25 while the glass element is being molded and the above object is achieved. For example, it is preferable that the plane member 25 is made of sintered hard alloy with thickness of about 1 to 5 mm, and it is polished so that the surface plane 25 has a maximum height Ry of not more than 0.03 μm.

A material same as the side surface forming member 23 can be used for the side surface forming member 24, but since it is not always necessary that a surface plane 27 is transferred to the glass material, in this case, the surface plane 27 does not always require the working which is given to the surface plane 25.

Figure 4A:
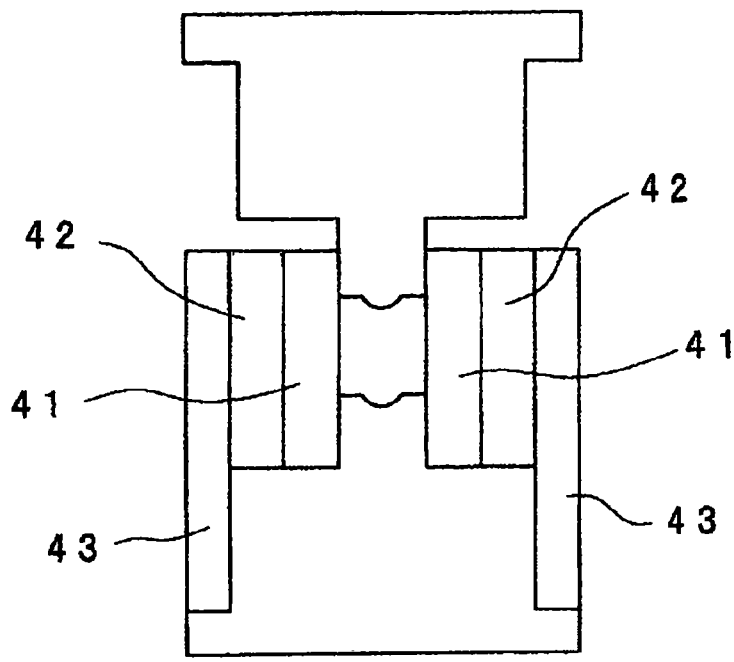
FIG. 4A is a diagram explaining a method of pressing a side surface member.
Figure 4B:
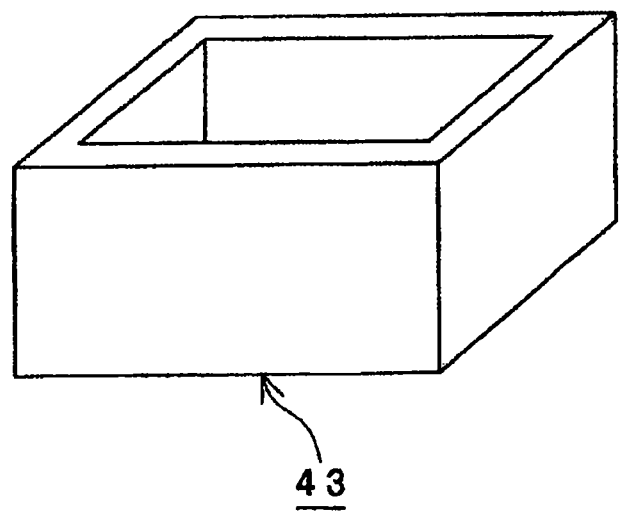
FIG. 4B is a schematic perspective view of a surrounding member.

In the method of pressing the side surface forming member, a pressing unit, a pressing condition and the like are not particularly limited as long as the reference surfaces 1 of the upper and lower dies can be maintained in the same plane while the glass material is being molded and distortion does not occur on the surface plane 25. As the pressing unit, for example, an air cylinder can be used. As shown in FIGS. 4A and 4B, in the constitution using a side surface forming member 41, a side surface pressing member 42, and a surrounding member 43 containing them, the material of the side surface pressing member has a larger coefficient of linear expansion than that of the materials of the side surface forming member and the surrounding member. In this state, when the glass element is heated to a temperature at which the glass is softened while the molding press, the side surface pressing member becomes larger than the other members due to heat expansion, so that the reference surfaces of the upper and lower dies can be easily pressed by the side surface forming member. The suitable materials of the side surface forming member and the side surface pressing member and the surrounding member are sintered hard alloy, stainless and sintered hard alloy, respectively.

The method of molding the glass material is effective not only for the case using a reheating method but also the case where the glass is molded by a method of directly pressing a dropped molten glass drop. Examples of the glass material are various glass materials such as crown type lanthanum silica glass, flint type lead silica glass and titanium silica glass.

Figure 3:
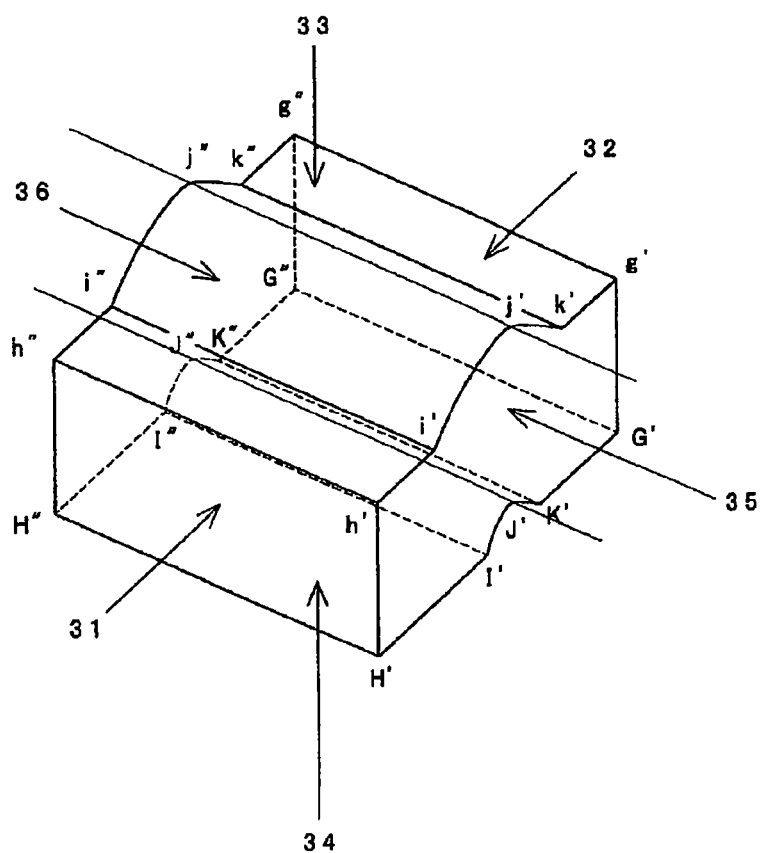
FIG. 3 is a schematic perspective view of a beam shaping element whose both surfaces are cylindrical surfaces.

FIG. 3 illustrates a schematic perspective view of the beam shaping element obtained by the above method using the upper and lower dies which are bilaterally-symmetric (FIG. 1) based on the reference surfaces 1 of the upper and lower dies and also the reference surfaces 2 of the upper and the lower dies similarly to the reference surfaces 1 of the upper and lower dies.
A plane H'h'h"H" (31) is a plane ("plane B") (also called as "directrix direction side surface 31") onto which the surface plane 25 of the side surface forming member 23 is transferred. A plane G'g'g"G"" (32) (also called as "directrix direction side surface 32") is a surface ("plane C") onto which the surface plane 27 of the side surface forming member 24 is transferred. A surface h'i'j'k'g'g"k"j"i"h" (33) is a surface onto which the molding surface of the lower die is transferred, and a surface H'I'J'K G'G"K"J"I"H" (34) is a surface onto which the molding surface of the upper die 1 is transferred. A plane H'I'J'K'G'g'k'J'i'h' (35) and a plane H"I"J"K"G"g"k"j"i"h" (36) are surfaces which are cut into planes vertical to the plane B. The surfaces 35 and 36 are not always formed so as to be vertical to the plane B.

When the side surface forming members are pressed, the dies are moved and the glass material is molded according to the defaults as mentioned above, the upper and lower dies can move only along the plane 25 formed by the side surface forming member 23. For this reason, in the above element, the non-arc axis (or arc center axis) of each cylindrical surface can be provided in a position of the default, namely, the parallel eccentricity of each surface can be within a tolerance (not more than 10 μm, preferably a value close to 0), and the tilt eccentricity of each surface can be within a tolerance (not more than 10 min., preferably a value close to 0).

The "parallel eccentricity of each surface" means a shift length to the directrix direction between a surface, which includes a line ("generatrix of the cylindrical surface 33a") where the non-arc axis (or arc center axis) of the cylindrical surface i'j'k'K"J"i" ("cylindrical surface 33a") of a upper surface 33 cross the cylindrical surface 33a and is parallel with the plane B, and a surface, which includes a line where the non-arc axis (or arc center axis) of the cylindrical surface I'J'K'K"J"I" ("cylindrical surface 34a") of a lower surface 34 cross the cylindrical surface 34a ("generatrix of the cylindrical surface 34a") and is parallel with the plane B.

The "tilt eccentricity of each surface" means a difference between an angle formed by the non-arc axis (or arc center axis) of the cylindrical surface 33a and the plane B and an angle formed by the non-arc axis (or arc center axis) of the cylindrical surface 34a and the plane B.

When the plane which is formed by connecting the generatrix of the cylindrical surface 33a and the generatrix of the cylindrical surface 34a is called as the "plane A", the plane B, the plane C and the plane A become approximately parallel in the beam shaping element obtained in the above manner.

When the beam shaping element in this embodiment as well as LD or the like are assembled, the plane B or the plane C are used as reference. As a result, if a jig for attaching the beam shaping element and LD obtains accuracy in the parallel eccentric direction, adjustment of the parallel eccentricity is not necessary. Adjustment of the tilt eccentricity is occasionally necessary because the block tilt eccentricity tolerance between the beam shaping element and LD is generally more strict than the tilt eccentricity tolerance of each surface of the beam shaping element. The "block tilt eccentricity tolerance between the beam shaping element and the LD" is a tilt eccentricity amount which is allowed when the beam shaping element and LD are assembled, and more specifically, it is defined by an allowable value of the tilt eccentricity between the plane which is parallel with the plane A and includes the generatrix of the cylindrical surface 33a or 34a and an optical axis of emitted light from LD. The block tilt eccentricity tolerance is generally not more than about 5 min. and not more than about 20 min. when an allowable width is large. Further, since any one of the plane B and the plane C may be used for the adjustment of the parallel eccentricity, from the viewpoint of the adjustment of the parallel eccentricity, for example, the plane C is not necessarily a plane as long as the plane B can be utilized for the adjustment of the parallel eccentricity, and thus for example, it may have an arc-like curved shape.

According to the method in this embodiment, an element in which the difference between the distance of the plane A to the plane B and the distance of the plane A to the plane C is not more than the block parallel eccentricity tolerance between the LD and the beam shaping element, such as the element shown in FIG. 3, can be manufactured. With such a beam shaping element, in the case where the element should be placed in a direction of from the surface 35 to the surface 36, for example, in an optical recording device, the element can be rotated about 180° to be placed also in a direction from the surface 36 to the surface 35. It is, therefore, not necessary that an element placing direction at the time of assembling the element is marked, and thus the element can be assembled in any directions.

The "block parallel eccentricity tolerance" is the parallel eccentricity quantity which is allowed when the beam shaping element and LD are assembled, and more specifically, it is defined by an allowable value of the parallel eccentricity in the directrix direction between the plane A and the optical axis of the emitted light from LD. The block parallel eccentricity tolerance is generally not more than about 10 μm, and not more than about 50 μm when an allowable width is large.

In the manufacturing method of the preferable embodiment, the die in which the plane vertical to the plane formed by connecting the non-arc axes or the arc center axes in the generatrix direction is formed adjacently to the upper die and/or the cylindrical surface is used. At least one plane, which includes the side HI or the side KG in the upper die of FIG. 1 or the side hi or the side kg in the lower die and extends to the generatrix direction, is formed, and the plane is formed so as to be vertical to the non-arc axis or the arc center axis. The tolerance of verticality is not more than about 2 min. This tolerance is a value which is sufficiently smaller than the block tilt eccentricity tolerance between the beam shaping element and LD. The element which is obtained by the element molding method of the present invention using such a die is provided with a plane portion which can be utilized for the adjustment of the block tilt eccentricity.

The element which is manufactured by the method in the preferable embodiment can be the beam shaping element in which a bottom surface and/or an upper surface approximately vertical to the plane A are/is provided adjacently to the cylindrical surface.

When the jig for attaching the beam shaping element and LD obtains accuracy in the tilt eccentric direction, the adjustment of the tilt eccentricity is not necessary.

In the present invention, the bottom surface and/or the upper surface approximately vertical to the plane A are/is at least partially formed as an optical surface. The other surfaces may be rough surfaces. The "optical surface" is a surface having surface roughness such that laser alignment is possible (laser reflected light is not broadened nor too dim). The surface roughness is preferably not more than 15 nmRMS. The "rough surface" is a surface where the laser reflected light is broadened and is dim. A target of the surface roughness is larger than 15 nmRMS.

The surface of the die onto which such an optical surface is transferred may be worked more accurately than the surface roughness of the optical surface.

The reason for the provision of the optical surface is that since the block tilt eccentricity tolerance between LD an the beam shaping element is generally about 1 to 5 min. which is strict, the tilt eccentricity is desirably adjusted by using a laser beam and thus the optical surface is used for such adjustment of the tilt eccentricity.

Since only one reference reflecting surface is sufficient for the adjustment of the tilt eccentricity using the laser beam, the surfaces other than the optical surface to be the reference reflecting surface may be rough surfaces, or tilt eccentric surfaces.

EXAMPLE

The beam shaping element which converts emitted light from LD with ellipticity of 2.2 was designed. A shape of the element was the same as that in FIG. 3, one surface had a non-arc convex shape with approximate radius of about 3.3 mm, and the other surface had a non-arc concave shape with approximate radius of 1.3 mm. The LD was arranged on the concave surface side of the beam shaping element, and more specifically, the distance between the generatrix of the convex surface and an emitting aperture of the LD was about 1.5 mm. As to an external shape of the element, H'-H" was 4 mm, H'-G' was 4 mm, and the distance between the generatrices was 3.8 mm.

As to the tolerance of each eccentricity, the parallel eccentricity of each surface (directrix direction) was 8 μm, the tilt eccentricity of each surface (about the generatrix direction) was 10 min., the block parallel eccentricity (directrix direction) was 10 μm, and the block tilt eccentricity (generatrix direction) was 5 min.

The material of the die was sintered hard alloy, and the die was worked by cutting. The upper die had the convex shape, and the lower die had the concave shape (similar to FIG. 2). The distance between the generatrix of the upper die and the reference surface of the upper die was 2 mm which was the half of the H'-G' 4 mm, and was actually 2.002 mm. The distance between the generatrix of the lower die and the reference surface of the lower die was 2 mm which was the half of H'-G' 4 mm, was actually 2.001 mm. Further, the plane portion of the upper die was the optical surface of 10 nmRMS, and the plane portion of the lower die was a rough surface of about 200 nmRMS.

A constitution of a molding jig including the upper and lower dies and the side surface forming member was similar to that in FIG. 4A. The side surface forming member had a thickness of 2 mm and its material was sintered hard alloy. The side surface pressing member had a thickness of 5 mm and its material was stainless, and a material of the surrounding member was sintered hard alloy.

As to the molding press, in the state that a glass preform made of U-LaF71 was placed on the lower die, the molding member including the upper and lower dies and the side surface forming member was heated to 700° C., the lower die including the side surface forming member was raised in the state that the upper die was retained, so that a relative distance between the upper die and the lower die was decreased and the shapes of the upper and lower dies were transferred to the glass preform. At this time, the width of the beam shaping element of the side surface pressing member in the directrix direction was increased by about 40 μm with respect to the peripheral members, and the side surface forming member could be pressed against the reference surfaces of the upper and lower dies.

When each eccentricity of the beam shaping element manufactured in the above manner was measured by using a three-dimensional shape measuring device, the parallel eccentricity of each surface (directrix direction) was 3±2 μm and the tilt eccentricity of each surface (about the generatrix direction) was 5±4 min. As a result, it was found that each eccentricity was within the tolerance.

Further, the distance between the plane A and the plane B was 3±4 μm, and could be sufficiently smaller than the block parallel eccentricity tolerance.

The tilt between the plane A and the plane portion of the concave surface side was 3 min.±0.5 min. This value is smaller than the block tilt eccentricity tolerance, and thus sufficient shape accuracy could be obtained for the adjustment of the block tilt eccentricity using an autocollimator.

In order to substantiate the possibility of adjusting using the autocollimator, when a laser beam was emitted to the plane portions of the beam shaping element, return rays from not only the plane portion on the concave side but also the plane portion on the convex surface were observed, and the rays were reflected to different directions. Since the plane on the concave side was the optical surface of the die and the plane on the convex side was the rough surface of the die, only the return light from the concave side could be observed clearly, so that the return light from the concave surface could be discriminated easily. As a result, it was confirmed that the block tilt eccentricity could be adjusted by the autocollimator.

The above explanation refers to the case where the glass optical element is the beam shaping element, but the present invention can be applied also to glass optical elements other than the beam shaping element.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A method of manufacturing an optical glass element comprising:
    providing an upper die having a cylindrical surface protruding from or recessed into an inwardly facing planar surface of the upper die and elongated along a longitudinal axis, and worked so as to have an upper die generatrix for connecting intersection points between a non-arc axis or an arc center axis and the cylindrical section along the longitudinal axis;
    providing a lower die having a cylindrical surface protruding from or recessed into an inwardly facing planar surface of the lower die and elongated along the longitudinal axis, and worked so as to have a lower die generatrix for connecting intersection points between a non-arc axis or an arc center axis and the cylindrical section along the longitudinal axis;
    pressing a side surface forming member against an upper die reference surface worked so that a distance from the upper die generatrix obtains a default;
    pressing a side surface forming member against a lower die reference surface worked so that a distance from the lower die generatrix obtains a default;
    the upper and lower die reference surfaces being perpendicular to the planar surfaces of the upper die and lower die, respectively;
    moving one or both of the upper and lower dies such that a distance between the upper die and the lower die is reduced while the upper die reference surface and the lower die reference surface are maintained in a single plane;
    molding a glass material arranged between the upper die and the lower die to form the optical glass element; and
    transferring a surface plane of the side surface forming member onto the glass optical element, wherein after the molding and transferring are complete the optical glass optical element has the property that when a first end of the optical glass optical element receives oval light then circular light will be transmitted at a second end of the optical glass optical element that is opposite the first end.

2. The method of claim 1 further comprising forming a surface on the glass optical element substantially parallel with a plane formed by connecting the generatrix of the cylindrical surface of the upper die and the generatrix of the cylindrical surface of the lower die.

3. The method of claim 1, wherein transferring the surface plane of the side surface forming member onto the glass optical element comprises transferring the surface plane of the side surface forming member onto a surface of the glass optical element that is parallel with a plane formed by connecting the generatrix of one cylindrical surface and the generatrix of the other cylindrical surface.

4. The method of claim 3 further comprising forming a surface on the glass optical element that is parallel with the surface onto which the surface plane of the side surface forming member is transferred.

5. The method of claim 1 further comprising forming a first plane adjacent to the upper die and/or cylindrical surface, wherein the first plane is perpendicular to a second plane formed by connecting the non-arc axes or the arc center axes in the generatrix direction.

6. The method of claim 1, wherein the oval light is generated from a blue laser.

* * * * *